W. V. D. KELLEY.
METHOD AND APPARATUS FOR PRODUCING COLORED MOTION PICTURES.
APPLICATION FILED JULY 12, 1915.
1,322,794.
Patented Nov. 25, 1919.
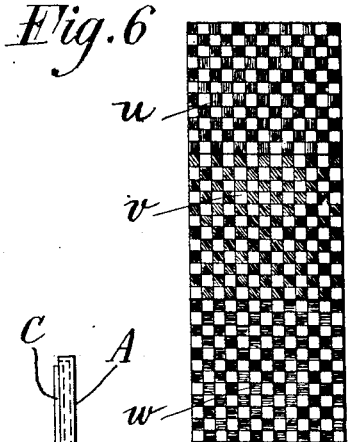
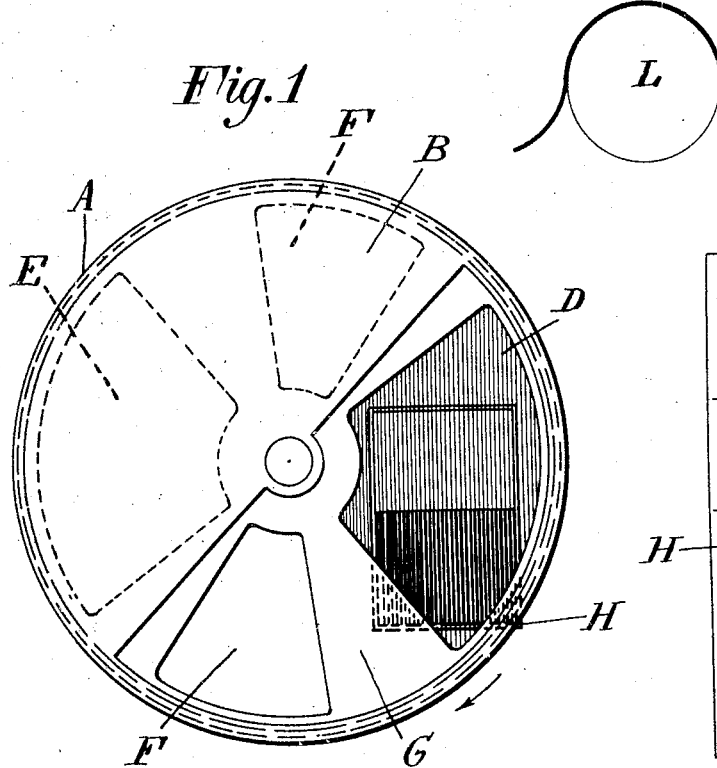
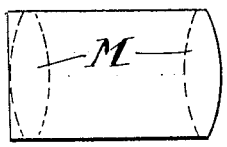
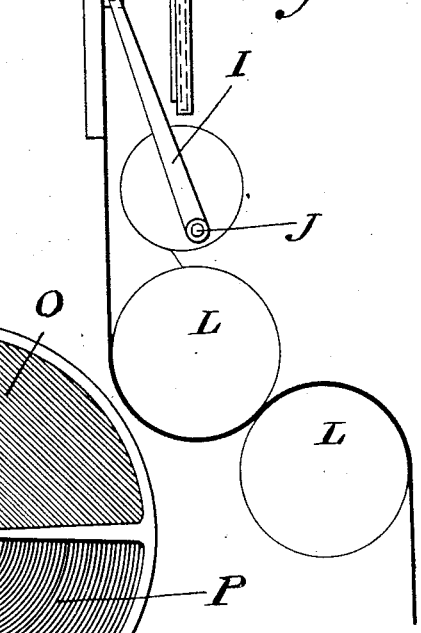
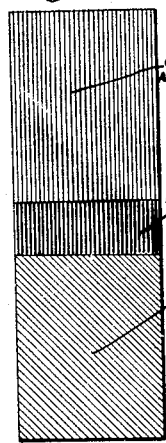
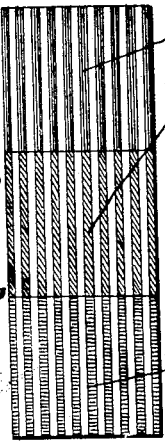
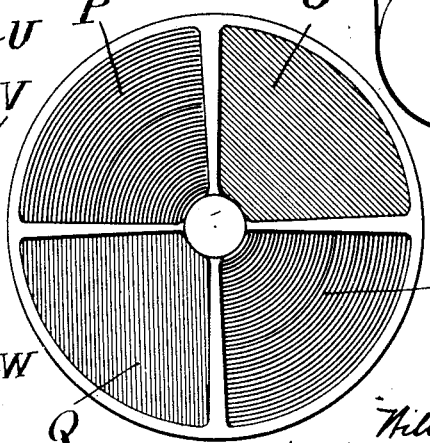
Inventor
William V. D. Kelley,
By his Attorneys
Edwards, Sager & Wooster

UNITED STATES PATENT OFFICE.

WILLIAM V. D. KELLEY, OF BROOKLYN, NEW YORK, ASSIGNOR TO PRIZMA INCORPORATED, A CORPORATION OF VIRGINIA.

METHOD AND APPARATUS FOR PRODUCING COLORED MOTION-PICTURES.

1,322,794. Specification of Letters Patent. Patented Nov. 25, 1919.

Application filed July 12, 1915. Serial No. 39,300.

*To all whom it may concern:*

Be it known that I, WILLIAM V. D. KELLEY, a citizen of the United States, residing at Brooklyn, in the county of Kings and State of New York, have invented certain new and useful Improvements in Methods and Apparatus for Producing Colored Motion-Pictures, of which the following is a full, clear, and exact specification.

This invention relates to method and apparatus for producing colored motion pictures, and has particular reference to an improved method and apparatus whereby, in a given time of exposure, more intense and pleasing color value images can be obtained than with methods heretofore used.

The invention relates to the known methods wherein the normal balance of light from the object for successive pictures is upset by passing it through color filters which only permit certain of the light constituents to act upon a sensitive panchromatic emulsion. These methods employ two, three or more color filters in each cycle, and a corresponding number of negatives having color values recorded thereon according to the particular filter through which it was exposed, are produced.

In such processes, the differences in color values in succeeding images of a series, when shown in coöperation with suitable colored lights on a projector, produce the sensations of the correct colors to the eye, due to persistence of vision.

It is the object of this invention to provide a method of exposure, and apparatus, applicable to known two, three or more color processes whereby the definition in the pictures will be increased, and rendered more uniform, without destroying or affecting the characteristic color values produced by the filters.

The usual method in a two-color process is to record the images in series of two, one of the redness of the subject taken through a red filter, and one of the greenness (usually containing blue) taken through the green-blue filter. In projecting the positive, the red-value image is shown with a red light and the green-blue image shown with a green-blue light. Rapidly shown, the colors blend and give a result approximating the original subject. Such pictures as above consist almost wholly of color with very little of true black and white gradations in the bright colors of the picture, and the object of the present invention is to more nearly approximate a black and white picture that has been tinted. Broadly, this result is obtained by recording a fraction, say, approximately one-half, the area of the subject on the film without color filters, thus giving a good full exposure in black and white without color-selective values. This might be compared to a half-tone picture, as it is obtained by means of a line screen blocking; say, half of the available picture area. The screen may be ruled in lines, or cross hatched, or in mosaic, or in irregular dots, or of the character of the screens commonly used in color-plate work or half-tone engraving. The clear and opaque areas of this screen will preferably be approximately equal, but this proportion may be varied where it is desired to modify the preferred proportion for special purposes.

The remainder of the exposure may be made through the usual color filter, over the entire picture area, or only on the unexposed area, as may be preferred. As this impression will be, for instance, of the redness in the subject, the color values will record fully on the unexposed parts of the film, between the line-screen impression, as well as giving a further impression of color on the already exposed part. The resulting picture thus represents a color value image combined with a partial colorless image.

There are several other ways of arriving at a similar result, but the method described allows of considerable regulation, such as the amount of opening, in exposure. For instance, if the first exposure is without filters, it may require regulation, as compared with the color exposure, since the exposure without a filter is more intense than one with a filter which offers interruption to the light.

One method of making the exposures is to use three shutters on the camera. One the regular cut-off shutter covering the change of film and change of line screen. The second shutter carries the line screen, and the third carries the color filter. The line-screen frame comes into position at the film-change and moves intermittently. The color filter frame in a two-color process moves one-half revolution for each picture and may move continuously. The cut-off shutter makes one complete revolution for each picture and may move continuously.

When projecting and displaying a two color-value motion picture by this process, the projector may be fitted with a revolving screen, carrying alternate sections of red and green filters, the red coloring the light for the red value image and the green coloring it for the green value image. If the light is projected and the screen revolved and there is no film to interrupt the light, the colors blend and give approximately white on the curtain. If a film carrying images without color values is run through a machine as described, with the color-screen attachment, the result on the curtain is a black and white picture. The part of each picture area taken without color values by my process gives just that result, the colorless parts of the images being in step in successive images throughout the length of the film. But if the film is one carrying alternate image records of the red and green in the subject taken, and has been properly made, the result will give color on the curtain. The part of the picture area taken through the color filter lines, and which is one-half of the picture area, therefore gives colors on the curtain.

My finished picture is, therefore, practically a black and white value and a color-value image shown both at one time without a line screen in the projector, although recorded separately on the film.

The invention is illustrated in several applications in the accompanying drawings, wherein—

Figure 1 is a perspective view of one form of shutter, filter and screen arrangement;

Fig. 2 is a side elevation of a portion of the apparatus for taking; and

Figs. 3, 4, 5 and 6 show, on enlarged scale, modified forms of filters and screens.

Referring first to Fig. 1, A is a rotary frame carrying the cut-off shutter B. C is a rotary filter frame carrying the several color filters D, E, varying according to the number of colors used, two being shown in this form. The frame C is also provided with a clear space or opening F for each color filter section. The spaces G between the filter sections D or E and the clear section F constitute shutters, which permit the line screen to be shifted out of the way before the exposure of the film to the colored filter sections. The screen is represented in Fig. 2 by a slide H, worked by pitman I from a crank J. K is the film which runs over the usual spools L, L. M are the lenses of the camera. The complete camera and gearing for driving the shutters, filters, screen and film are not shown herein, as they will be well understood to those skilled in the art.

Where oversensitiveness of the film to blue or ultra-violet is to be compensated for, the sections F, instead of being clear, may be colored light yellow, which will stop the extreme blue rays of the spectrum.

The cut-off shutter B makes one revolution for each picture, and covers the film change. The filter shutter C is then in position to allow the uncolored, or compensated light to pass through spaces F, and also through the screen H, which at this time is in front of the lens. See Fig. 2. Fig. 1 shows the screen H in inactive position below the lens M. The filter frame now revolves to bring the filter section D opposite the lens, while the screen H has moved out of the way to the position shown in Fig. 2. The screen H makes this movement as the filter frame shutter section G passes the lens opening. The exposure for one combined plain and color negative is now complete, and the film is changed while covered by shutter B ready to repeat the process for the next color. While shown in a two-color process, it is evident that the same process is applicable to three, four or more color processes. In each case, each negative will be a compound of a plain and a color exposure. The plain exposure through the screen without color value is largely depended on to furnish the details in the picture, and the exposure through the color filter furnishes the tint. Thus a satisfactory result is obtained by giving, say, a full exposure to the colorless impression, and a relatively under exposure to the color impression. This latter fills in the open spaces in the positives with black and partial tones of black, such as gray, except where color appears.

Fig. 3 shows a modification wherein the screen and filter are on the same frame, and are exposed alternately. O, Q represent the color filters and P, P the screens, which may be colored yellow to compensate the light, as above described, if desired. The lines on the screen are circular, as shown, so as to permit the screen to move during exposure without blurring.

In Fig. 4, the line screen R, composed of opaque and clear spaces, is intermediate the color filters S, T. This arrangement reciprocates so as to expose each film section to the screen R, and one of the filter sections S or T, the exposure being made as the screen moves.

In Fig. 5, the color filters are composed of ruled colored lines separated by clear spaces mounted on a slide. The illustration shows a slide for three colors, U, V, W. Each section comes into position during the film change and remains for the entire exposure, so that both the color and colorless, or black and white, exposures are made simultaneously.

In Fig. 6, a further modification is shown, wherein the screen and filter sections alternate both longitudinally and transversely.

In this form, the filter and screen portions of one color should register with those of the other sections as shown, and similarly to Figs. 3, 4, 5, so that a color impression will not become confused with a black and white impression. It will be understood that the lines shown in the filter sections represent the conventional showings of different colors, as D in Fig. 1; O, Q, in Fig. 3; S, T, in Fig. 4; and U, V, W, in Figs. 5 and 6.

By this process I am as sure of a picture with good definition as is the worker in black and white cinematography. If one-half the image, viz.: the colorless one, is made alone and projected, no loss of effect is felt in viewing it. For this reason, I can use abrupt filters in taking the color values as the color-value image is depended on mainly for color and not for the image as heretofore practised.

In all of the forms shown, it will be seen that each image will be characterized by a combination of plain and color exposures, both superposed and side by side as in Figs. 1 and 3, and side by side only, as in Fig. 5. In all of the forms described, it will be understood that the series of colors employed will be such that when combined they give white or substantially white. In superposing a color exposure on a film already exposed through the screen to black and white, the exposed portions are not affected to the same extent by the color as the unexposed portions, because of the reduced sensitiveness of the exposed portions. It is thus preferable to make the screen exposure first, but the reverse operation of exposing first to the color, and then in part to the screen is within the scope of this invention, and simply involves slight changes in the arrangement and timing of the screens and filters herein shown. It will be understood that the screen lines will be fine enough, and sufficiently close together so that they will blend when projected and not give an effect of lines on the picture. I have obtained satisfactory results with screens having 200 to 400 lines to the inch, but either finer or coarser screens can be used.

The forms herein shown are illustrative, and it will be understood that the proportions of screen and filter areas, the exact colors, and dimensions will vary with different processes, and also with different qualities of panchromatic film.

Having thus described my invention, I declare that what I claim as new and desire to secure by Letters Patent, is:—

1. The step in making a succession of photographic records which consists in giving an open exposure to parts of each entire picture area and an exposure of the remainder through a color filter, the color filters for different sections being different.

2. A series of color value impressions each composed of a color value record which differs from the others of the series, plus a separate monochromatic image substantially without distinctive color value.

3. The method of recording color value images which consists in exposing a panchromatic emulsion to white light through a screen, and entire emulsion to colored light through a filter.

4. The method of recording color value images in series, which consists in exposing each section of panchromatic emulsion to white light through a screen and the remainder through one of the color filters of said series, successive color filters being different.

5. A color filter composed of parallel clear and colored lines.

6. A taking apparatus comprising a movable color filter, and means for rendering the filter substantially ineffective on a portion of the image.

7. A taking apparatus comprising a movable multi color filter, and means for rendering the filter of each section ineffective on a portion of the image.

8. A taking apparatus comprising a color filter and lined screen having substantially equal effective non-interfering portions.

9. A taking apparatus comprising a color filter and lined screen having non-interfering portions, and means compensating for preponderance of blue.

In testimony whereof I affix my signature, in presence of two witnesses.

WILLIAM V. D. KELLEY.

Witnesses:
LAURA B. PENFIELD,
JOSEPH D. CONNOLLY, Jr.